(12) United States Patent
Kim et al.

(10) Patent No.: US 8,748,038 B2
(45) Date of Patent: Jun. 10, 2014

(54) CATHODE ACTIVE MATERIAL, CATHODE INCLUDING THE CATHODE ACTIVE MATERIAL, LITHIUM BATTERY INCLUDING THE CATHODE, AND METHOD OF PREPARING THE CATHODE ACTIVE MATERIAL

(75) Inventors: Gue-sung Kim, Yongin-si (KR); Won-chang Choi, Yongin-si (KR); Kyu-sung Park, Suwon-si (KR)

(73) Assignee: Samsung SDI Co., Ltd., Yongin-Si, Gyeonggi-Do (KR)

( * ) Notice: Subject to any disclaimer, the term of this patent is extended or adjusted under 35 U.S.C. 154(b) by 41 days.

(21) Appl. No.: 12/926,860

(22) Filed: Dec. 14, 2010

(65) Prior Publication Data

US 2011/0151325 A1 Jun. 23, 2011

(30) Foreign Application Priority Data

Dec. 23, 2009 (KR) .................. 10-2009-0130032

(51) Int. Cl.
*H01M 4/13* (2010.01)
*H01M 4/60* (2006.01)
*H01M 4/02* (2006.01)
*H01M 4/04* (2006.01)

(52) U.S. Cl.
CPC . *H01M 4/02* (2013.01); *H01M 4/04* (2013.01)
USPC ...................................... 429/212; 252/182.1

(58) Field of Classification Search
CPC ............ H01M 4/00; H01M 4/02; H01M 4/04
See application file for complete search history.

(56) References Cited

U.S. PATENT DOCUMENTS

| 7,029,793 B2 * | 4/2006 | Nakagawa et al. ........ 429/231.1 |
| 2003/0067005 A1 * | 4/2003 | De Leeuw et al. ............. 257/72 |
| 2004/0234865 A1 * | 11/2004 | Sato et al. .................... 429/322 |
| 2005/0048367 A1 | 3/2005 | Igaki et al. |
| 2009/0017378 A1 * | 1/2009 | Charest et al. ............... 429/212 |
| 2009/0305132 A1 * | 12/2009 | Gauthier et al. ............. 429/207 |

FOREIGN PATENT DOCUMENTS

| JP | 2005-063953 A | 3/2005 |
| KR | 10 2008-0015161 A | 2/2008 |
| KR | 10 2009-0012182 A | 2/2009 |
| KR | 10 2009-0013841 A | 2/2009 |
| WO | WO 2007-129842 A1 | 11/2007 |
| WO | WO 2009-014399 A2 | 1/2009 |

* cited by examiner

*Primary Examiner* — Zachary Best
*Assistant Examiner* — Jennifer Rea
(74) *Attorney, Agent, or Firm* — Lee & Morse, P.C.

(57) ABSTRACT

A cathode active material, a cathode including the cathode active material, a lithium battery including the cathode, and a method of preparing the cathode active material, the cathode active material including a lithium-containing metal oxide and an organic material coated on the lithium-containing metal oxide, the organic material including an acrylate or methacrylate organic material including an alkyleneglycol unit.

14 Claims, 2 Drawing Sheets

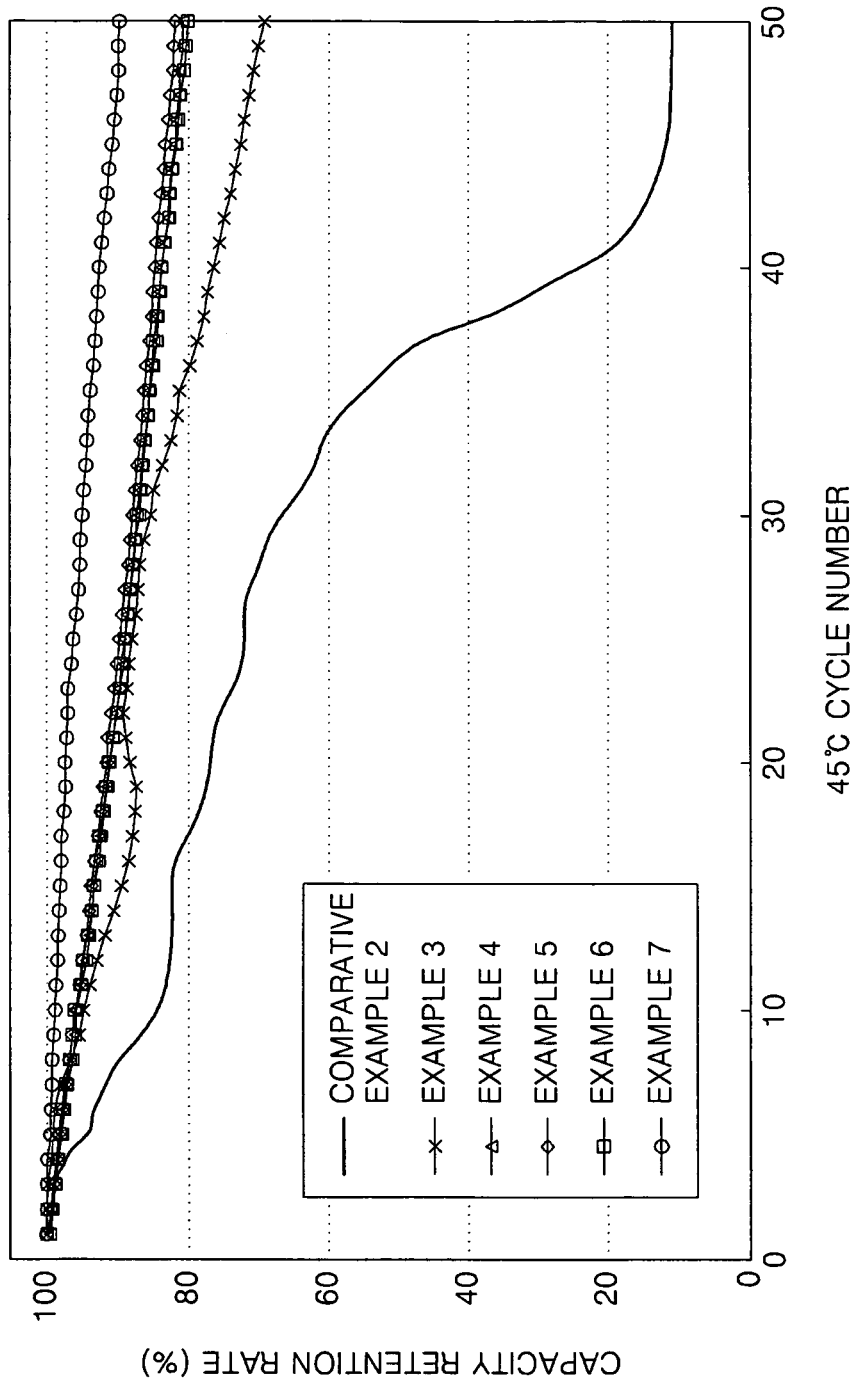

CATHODE ACTIVE MATERIAL, CATHODE INCLUDING THE CATHODE ACTIVE MATERIAL, LITHIUM BATTERY INCLUDING THE CATHODE, AND METHOD OF PREPARING THE CATHODE ACTIVE MATERIAL

BACKGROUND

1. Field

Embodiments relate to a cathode active material, a cathode including the cathode active material, a lithium battery including the cathode, and a method of preparing the cathode active material.

2. Description of the Related Art

In order to satisfy miniaturization and high-performance requirements for various devices, miniaturization and weight-reduction of lithium batteries may play an important role. In addition, in order to utilize lithium batteries in, e.g., electric vehicles or the like, stability to withstand high-temperatures and high-voltage and high efficiency and cycle characteristics of lithium batteries may be important. Various cathode active materials have been analyzed in order to realize a lithium battery for satisfying these uses.

$LiCoO_2$ is a cathode active material that is commercially available. $LiCoO_2$ is relatively expensive and has an actual electric capacitance of 140 to 150 mAh/g, corresponding to about 50% of a theoretical capacitance.

SUMMARY

Embodiments are directed to a cathode active material, a cathode including the cathode active material, a lithium battery including the cathode, and a method of preparing the cathode active material.

At least one of the above and other features and advantages may be realized by providing a cathode active material including a lithium-containing metal oxide; and an organic material coated on the lithium-containing metal oxide, the organic material including an acrylate or methacrylate organic material including an alkyleneglycol unit.

The acrylate or methacrylate organic material including the alkyleneglycol unit may be represented by Formula 1 below:

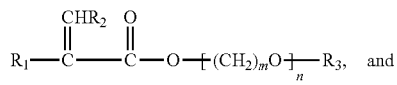

in Formula 1 $R_1$ may be a hydrogen atom or a methyl group; $R_2$ may be a hydrogen atom, a $C_1$-$C_{20}$ alkyl group, or a $C_6$-$C_{30}$ aryl group; $R_3$ may be a hydrogen atom, a $C_1$-$C_{20}$ alkyl group, a $C_6$-$C_{30}$ aryl group, a methacrylate group, or an acrylate group; m may be an integer of 1 to about 30; and n may be an integer of 1 to about 100,000.

The acrylate or methacrylate organic material including the alkyleneglycol unit represented by Formula 1 may include at least one of poly(ethyleneglycol) methyl ether methacrylate, poly(ethyleneglycol)diacrylate, poly(ethyleneglycol)dimethacrylate, poly(ethyleneglycol) ethyl ether methacrylate, di(ethyleneglycol) di(meth)acrylate, tri(ethyleneglycol) di(meth)acrylate, di(ethyleneglycol) ethylhexyl)ether acrylate, di(ethyleneglycol) ethyl ether acrylate, tetra(ethyleneglycol) diacrylate, and di(ethyleneglycol) methyl ether methacrylate.

The organic material may be included in an amount of about 0.01 to about 20 parts by weight, based on 100 parts by weight of the lithium-containing metal oxide.

The lithium-containing metal oxide may include at least one of $LiCo_{1-x}M_xO_{2-y}L_y$ (0≤x≤0.9, 0≤y≤0.3), $Li_xM_yMo_zO_{3-z}L_z$ (0.5≤x≤2.3, 0≤y≤0.3, 0.7≤z≤1.1, 0≤z≤1.5), $LiMn_{x-y}M_yO_{2x-z}L_z$ (x=1, 2, 0≤y≤0.5, 0≤z≤1.5), $LiNi_{1-x}Mn_{x-y}M_yO_{2x-z}L_z$ (0<x<1, 0≤y≤0.3, 0≤x≤2), $Li_{1-x-y}Co_xMn_yM_zO_{2-a}L_a$ (0≤x≤0.5, 0≤y≤0.5, 0≤z≤0.5, 0≤a≤1), $LiMn_{1-x}M_xPO_4$ (0≤x≤0.99), and $LiFe_{1-x}M_xPO_4$ (0≤x≤0.99), M may include at least one of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), scandium (Sc) and yttrium (Y); and L may include sulfur (S) or fluorine (F).

At least one of the above and other features and advantages may also be realized by providing a cathode comprising the cathode active material of an embodiment.

The acrylate or methacrylate organic material including the alkyleneglycol unit may be represented by Formula 1 below:

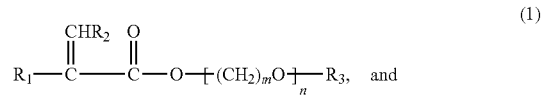

in Formula 1 $R_1$ may be a hydrogen atom or a methyl group; $R_2$ may be a hydrogen atom, a $C_1$-$C_{20}$ alkyl group, or a $C_6$-$C_{30}$ aryl group; $R_3$ may be a hydrogen atom, a $C_1$-$C_{20}$ alkyl group, a $C_6$-$C_{30}$ aryl group, a methacrylate group, or an acrylate group; m may be an integer of 1 to about 30; and n may be an integer of 1 to about 100,000.

The acrylate or methacrylate organic material including the alkyleneglycol unit represented by Formula 1 may include at least one of poly(ethyleneglycol) methyl ether methacrylate, poly(ethyleneglycol)diacrylate, poly(ethyleneglycol)dimethacrylate, poly(ethyleneglycol)ethyl ether methacrylate, di(ethyleneglycol) di(meth)acrylate, tri(ethyleneglycol) di(meth)acrylate, di(ethyleneglycol) (2-ethylhexyl)ether acrylate, di(ethyleneglycol) ethyl ether acrylate, tetra(ethyleneglycol)diacrylate, and di(ethyleneglycol) methyl ether methacrylate.

The organic material may be included in an amount of about 0.01 to about 20 parts by weight, based on 100 parts by weight of the lithium-containing metal oxide.

The lithium-containing metal oxide may include at least one of $LiCo_{1-x}M_xO_{2-y}L_y$ (0≤x≤0.9, 0≤y≤0.3), $Li_xM_yMo_zO_{3-z}L_z$ (0.5≤x≤2.3, 0≤y≤0.3, 0.7≤z≤1.1, 0≤z≤1.5), $LiMn_{x-y}M_yO_{2x-z}L_z$ (x=1, 2, 0≤y≤0.5, 0≤z≤1.5), $LiNi_{1-x}Mn_{x-y}M_yO_{2x-z}L_z$ (0<x<1, 0≤y≤0.3, 0≤z≤2), $Li_{1-x-y}CO_xMn_yM_zO_{2-a}L_a$ (0≤x≤0.5, 0≤y≤0.5, 0≤z≤0.5, 0≤a≤1), $LiMn_{1-x}M_xPO_4$ (0≤x≤0.99), and $LiFe_{1-x}M_xPO_4$ (0≤x≤0.99), M may include at least one of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), scandium (Sc) and yttrium (Y); and L may include sulfur (S) or fluorine (F).

At least one of the above and other features and advantages may also be realized by providing a lithium battery comprising the cathode of an embodiment.

At least one of the above and other features and advantages may also be realized by providing a method of preparing of a cathode active material, the method including mixing a lithium-containing metal oxide, an acrylate or methacrylate organic material including an alkyleneglycol unit, and a solvent to obtain a mixture; and drying the mixture.

The drying may be performed for about 0.1 to about 20 hours at a temperature equal to or lower than about 100° C.

BRIEF DESCRIPTION OF THE DRAWINGS

The above and other features and advantages will become more apparent to those of ordinary skill in the art by describing in detail exemplary embodiments with reference to the attached drawings, in which:

FIG. 2 illustrates a graph of capacity retention rates with respect to a number of cycles of batteries prepared in Comparative Example 2 and Examples 3 to 7.

DETAILED DESCRIPTION

Figure 1:
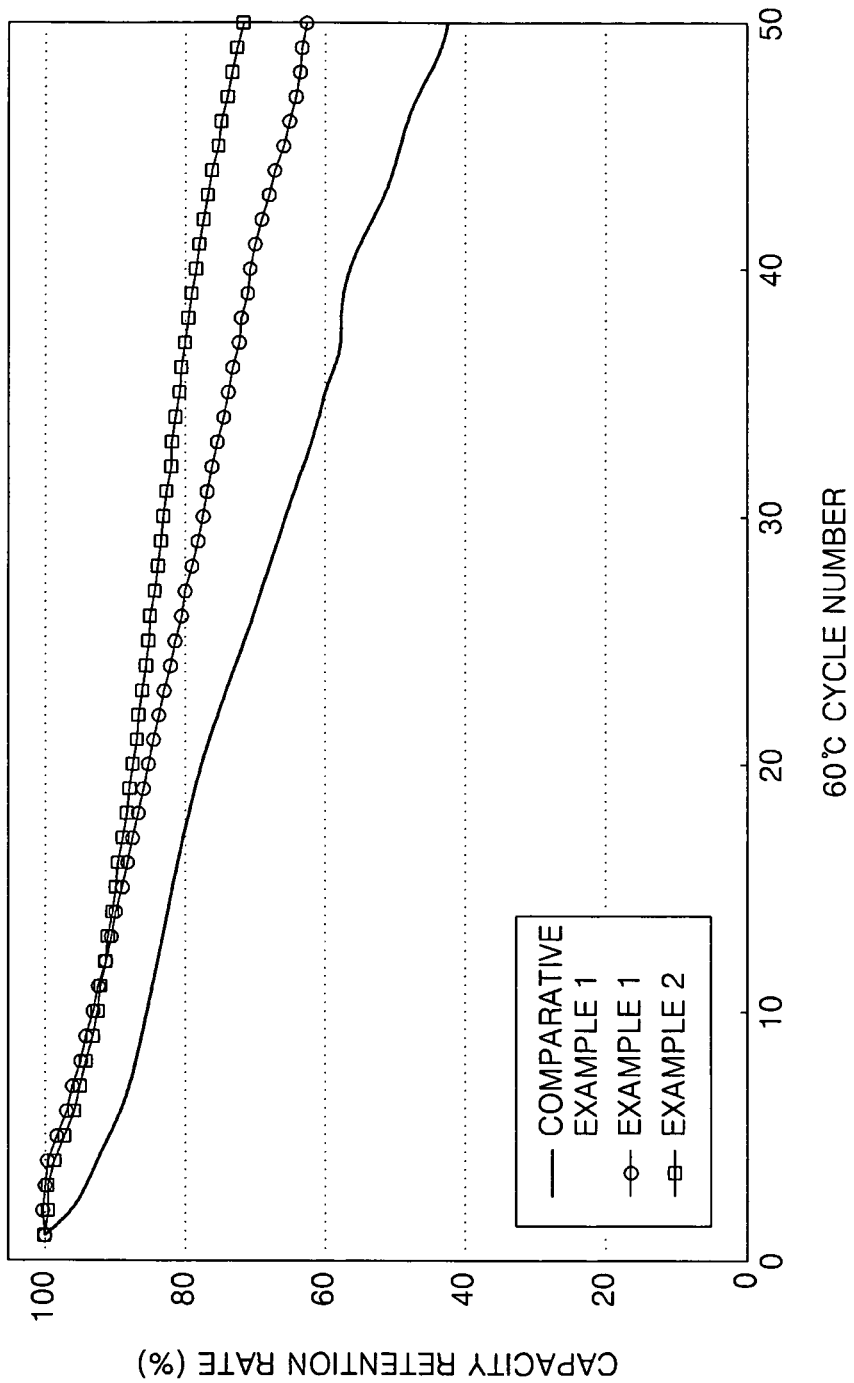
FIG. 1 illustrates a graph of capacity retention rates with respect to a number of cycles of batteries prepared in Comparative Example 1 and Examples 1 and 2.

Korean Patent Application No. 10-2009-0130032, filed on Dec. 23, 2009, in the Korean Intellectual Property Office, and entitled: "Cathode Active Material, Cathode Including Cathode Active Material, Lithium Battery Including Cathode, and Method of Preparing Cathode Active Material," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Hereinafter, one or more embodiments will be described in greater detail.

A cathode active material according to an embodiment may include a lithium-containing metal oxide and an organic material. In an implementation, the lithium-containing metal oxide may be a core and the organic material may be a coating layer on the lithium-containing metal oxide core. The organic material may include an acrylate or methacrylate organic material including an alkyleneglycol unit.

The organic material including the acrylate or methacrylate organic material including the alkyleneglycol unit may be formed on part of or an entire area of a surface of the lithium-containing metal oxide, e.g., the organic material may form the coating layer on the lithium-containing metal oxide. Thus, the lithium-containing metal oxide may be a lithium-containing metal oxide core with the organic material present at the surface of the lithium-containing metal oxide core. For example, the organic material may be partially formed on a surface of the lithium-containing metal oxide core in the form of an island. Alternatively, the organic material may be coated to completely cover the lithium-containing metal oxide core. The organic material may be coated on the lithium-containing metal oxide core, thereby increasing thermal and electrical stability of the lithium-containing metal oxide core. For example, undesirable side reactions such as elution of transition metal and/or decomposition of an electrolyte solution may be prevented at high temperature and high voltage. For example, the cathode active material and the electrolyte solution may be prevented from contacting each other due to the presence of the organic material. Thus, during charge and discharge at high temperature, undesirable elution of a metal e.g., manganese (Mn) and/or molybdenum (Mo), due to HF generated during the decomposition of electrolyte solution in the cathode active material, may be prevented.

In the cathode active material, the acrylate or methacrylate organic material including the alkyleneglycol unit may be represented by Formula 1, below:

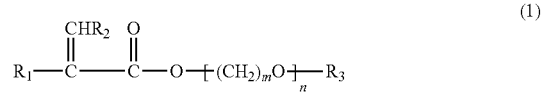

(1)

In Formula 1, $R_1$ may be a hydrogen atom or a methyl group;

$R_2$ may be a hydrogen atom, a $C_1$-$C_{20}$ alkyl group, or a $C_6$-$C_{30}$ aryl group;

$R_3$ may be a hydrogen atom, a $C_1$-$C_{20}$ alkyl group, a $C_6$-$C_{30}$ aryl group, a methacrylate group, or an acrylate group;

m may be an integer of 1 to about 30; and n may be an integer of 1 to about 100,000.

In an implementation, $R_1$ may be a hydrogen atom or a methyl group.

In an implementation, the acrylate or methacrylate organic material including the alkyleneglycol unit represented by Formula 1 may include, e.g., at least one of poly(ethyleneglycol) methyl ether methacrylate, poly(ethyleneglycol)diacrylate, poly(ethyleneglycol)dimethacrylate, poly(ethyleneglycol) ethyl ether methacrylate, di(ethyleneglycol) di(meth)acrylate, tri(ethyleneglycol) di(meth)acrylate, di(ethyleneglycol) (2-ethylhexyl)ether acrylate, di(ethyleneglycol) ethyl ether acrylate, tetra(ethyleneglycol)diacrylate, and di(ethyleneglycol) methyl ether methacrylate.

In an implementation, the organic material may be included in an amount of about 0.01 to about 20 parts by weight, based on 100 parts by weight of the lithium-containing metal oxide. Maintaining the amount of the organic material at about 0.01 to about 20 parts by weight may help ensure that cycle characteristics of a lithium battery including the cathode active material are improved.

The cathode active material may include any suitable lithium-containing metal oxide. For example, the lithium-containing metal oxide may include $LiCo_{1-x}M_xO_{2-y}L_y$, ($0 \leq x \leq 0.9$, $0 \leq y \leq 0.3$), $Li_xM_yMo_zO_{3-z}L_z$ ($0.5 \leq x \leq 2.3$, $0 \leq y \leq 0.3$, $0.7 \leq z \leq 1.1$, $0 \leq z \leq 1.5$), $LiMn_{x-y}M_yO_{2x-z}L_z$ (x=1, 2, $0 \leq y \leq 0.5$, $0 \leq z \leq 1.5$), $LiNi_{1-x}Mn_{x-y}M_yO_{2x-z}L_z$ ($0 < x < 1$, $0 \leq y \leq 0.3$, $0 \leq z \leq 2$), $Li_{1-x-y}CO_xMn_yM_zO_{2-a}L_a$ ($0 \leq x \leq 0.5$, $0 \leq y \leq 0.5$, $0 \leq z \leq 0.5$, $0 \leq a \leq 1$), $LiMn_{1-x}M_xPO_4$ ($0 \leq x \leq 0.99$), or $LiFe_{1-x}M_xPO_4$ ($0 \leq x \leq 0.99$). M may include, e.g., at least one of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), scandium (Sc), and yttrium (Y), and L may include, e.g., sulfur (S) and/or fluorine (F).

A method of preparing a cathode active material according to an embodiment may include mixing a lithium-containing metal oxide, a methacrylate or acrylate organic material including a polyalkyleneglycol unit, and a solvent; and drying the mixture.

The solvent may not be particularly limited, and may include any suitable solvent that is commonly used in the art. Examples of the solvent may include water, ethanol, and methanol.

After performing the drying, the mixture may be heated to form a structure where the lithium-containing metal oxide is coated with the organic material, e.g., the coating layer.

For example, the method of preparing the cathode active material may include preparing a mixture slurry by mixing a lithium-containing metal oxide, a methacrylate or acrylate organic material including a polyethyleneglycol unit, and a solvent; and then drying the mixture slurry for about 0.1 to about 20 hours at a temperature equal to or lower than about 100° C. Then, the mixture slurry may be treated for about 1 to about 20 hours at a temperature of about 100 to about 300° C. under an air, vacuum, or nitrogen atmosphere. The conditions are not limited to the examples described above, and may be appropriately adjusted.

The lithium-containing metal oxide used as, e.g., the core of the cathode active material, may be prepared using, e.g., a solid phase method including mixing a lithium raw material and a metal-containing raw material and sintering the mixture.

Alternatively, the lithium-containing metal oxide may be prepared using a polymer chelating method including forming sol by dissolving a lithium raw material and a metal-containing raw material or the like in an aqueous acid solution, combusting gel obtained by evaporating moisture from the sol, and additionally heating the gel to obtain lithium-containing metal oxide powder.

For example, the lithium-containing metal oxide may be prepared using a method including forming sol by mixing the lithium raw material, the metal-containing raw material, diluted nitric acid, an aqueous citric acid solution, and ethyleneglycol; forming a gel by heating the sol and thermally decomposing the gel; and heating the thermally decomposed gel.

The citric acid in the aqueous citric acid solution may function as a chelating agent. The ethyleneglycol may be gelated to function as a matrix. A concentration of the diluted nitric acid may be about 0.01 to about 10 wt %.

A mixing ratio of the lithium raw material, the metal-containing raw material, the citric acid, and the ethyleneglycol may be appropriately selected within an appropriate range for obtaining the improved cycle characteristic of a lithium battery.

During the thermal decomposition of the gel after the gel is formed by heating the sol, a phase change may occur as a reaction vessel containing the sol is continuously heated. For example, when the reaction vessel containing the sol is heated, the sol may be changed to the gel, moisture may be evaporated, and then residues may be thermally decomposed. In order to thermally decompose the sol, the reaction vessel containing the sol may be heated for about 1 to about 5 hours at a temperature of about 300 to about 500° C. However, the conditions are not limited to the examples described above, and may be selected within an appropriate range if desired. The thermally decomposed gel may be heated by flowing dried air onto the gel for about 3 to about 12 hours at a temperature of about 850 to about 1,100° C. However, the conditions are not limited to the examples described above, and may be selected within an appropriate range if desired. The heated lithium-containing metal oxide may be dried and cooled in a furnace.

In addition, the lithium-containing metal oxide may be prepared using the following co-precipitation method. For example, a lithium raw material and a metal-containing raw material may be mixed in a solvent in a desired equivalent ratio. In an implementation, ethanol, methanol, water, or acetone may be appropriately used as the solvent. The lithium-containing metal oxide may be prepared by heating the obtained mixture at a temperature of about 400 to about 600° C. Secondary heating may be performed on the prepared lithium-containing metal oxide at a temperature of about 700 to about 1,000° C.

The lithium raw material and the metal containing raw material may be a precursor of lithium or a precursor of another metal (hereinafter "a metal precursor") included in the lithium-containing metal oxide. The type of the metal precursor is not particularly limited, but the metal precursor may generally include a salt including a metal, or a complex including a metal coordinated with an organic ligand.

An amount of the metal precursor may be appropriately selected according to the kind of a metal included in the metal precursor in consideration of the composition of a desired lithium-containing metal oxide. In an implementation, the metal precursor may include, e.g., nickel acetate, cobalt acetate, manganese acetate, ammonium heptamolybdate, and lithium carbonate.

A cathode according to an embodiment may include the cathode active material. For example, the cathode may be prepared by molding a mixed cathode material including the cathode active material and a binder into a desired shape, or by coating the mixed cathode material on a current collector such as Cu foil and/or an Al foil.

For example, a cathode active material, a conducting agent, a binder, and a solvent may be mixed to prepare the mixed cathode material. A cathode plate may be prepared by coating the mixed cathode material directly on an Al foil current collector, or by casting the mixed cathode material on a separate support and then laminating a cathode active material film separated from the support on an Al foil current collector. The cathode is not limited to the examples described above, and may be one of a variety of types.

The conducting agent may include, e.g., carbon black or graphite particulates. The binder may include, e.g., a vinylidene fluoride/hexafluoropropylene copolymer, polyvinylidene fluoride (PVDF), polyacrylonitrile, polymethylmethacrylate, polytetrafluoroethylene, mixtures of these materials, and/or a styrene butadiene rubber polymer. The solvent may include, e.g., N-methyl-pyrrolidone, acetone, water, or the like. Amounts of the cathode active material, the conducting agent, the binder, and the solvent may be suitable amounts that are commonly used in the art.

A lithium battery according to an embodiment may include a cathode including the cathode active material. The lithium battery may be prepared in the following manner.

First, the cathode may be prepared using the method described above.

Next, a mixed anode material may be prepared by mixing an anode active material, a conducting material, a binder, and a solvent. An anode plate may be prepared by coating the mixed anode material directly on a Cu foil current collector, or by casting the mixed anode material on a separate support and then laminating an anode active material film separated from the support on the Cu foil current collector. In an implementation, amounts of the anode active material, the conducting agent, the binder, and the solvent may be suitable amounts that are commonly used in the art.

The anode active material may include, e.g., lithium metal, a lithium alloy, a carbonaceous material, or graphite. The conducting agent, the binder, and the solvent in the mixed anode material may be the same as those in the mixed cathode material. If desired, a plasticizer may be added to the mixed cathode material and the mixed anode material to form pores inside the cathode and anode plates, respectively.

The cathode and the anode may be separated from each other by a separator. Any suitable separator that is commonly used for lithium batteries may be used. The separator may have a low resistance to ion mobility of electrolyte and excellent electrolyte solution retaining properties. The separator may include, e.g., glass fiber, polyester, Teflon, polyethylene, polypropylene, polytetrafluoroethylene (PTFE), and a combination thereof, each of which may be a non-woven or woven fabric. For example, a windable separator including polyethylene, polypropylene, or the like may be used for a lithium ion battery. A separator having excellent organic electrolyte solution retaining properties may be used for a lithium-ion polymer battery. These separators may be manufactured using the following method.

The separator may be prepared by mixing a polymer resin, a filler, and a solvent to prepare a separator composition, coating the separator composition directly on an electrode, and then drying the separator composition to form a separator film. Alternatively, the separator may be prepared by casting the separator composition on a support, drying the separator composition and then laminating a separator film separated from the support on an electrode.

The polymer resin is not particularly limited, and any suitable polymer resin that is commonly used for binding electrode plates in lithium batteries may be used. The polymer resin may include, e.g., a vinylidenefluoride/hexafluoropropylene copolymer, polyvinylidene fluoride (PVDF), polyacrylonitrile, polymethylmethacrylate, and/or a mixture thereof.

An electrolyte solution used in the lithium battery may be prepared by dissolving a lithium salt in a solvent. The solvent may include, e.g., propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and/or mixtures thereof. The lithium salt may include, e.g., $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$, where x and y are each independently a natural number, LiCl, LiI, and/or mixtures thereof.

A battery assembly may be formed by interposing the separator between the cathode plate and the anode plate. A lithium ion battery may be prepared by winding or folding the battery assembly, accommodating the battery assembly in a cylindrical or rectangular battery case, and then injecting an organic electrolyte solution into the battery case. Alternatively, a lithium ion polymer battery may be prepared by stacking the battery assembly in a bi-cell structure, impregnating the bi-cell structure with the organic electrolyte solution, putting the resultant into a pouch, and then hermetically sealing the pouch.

Hereinafter, one or more embodiments will be described in detail with reference to the following examples. However, these examples are not intended to limit the purpose and scope of the one or more embodiments.

Preparation Example 1

Preparation of Cathode Active Material $Li_2MoO_3$

As starting materials, lithium carbonate ($Li_2CO_3$) and molybdenum (VI) oxide ($MoO_3$), both in powder form, were mixed in a ratio of 1:1 by weight and reacted for 5 hours at a temperature of 500° C. A white $Li_2MoO_4$ with a homogeneous composition was prepared, and then heating was performed twice on the white $Li_2MoO_4$ with a homogeneous composition for 10 hours under a reduction condition at a temperature of 700° C. for a reaction represented by Reaction Scheme 1 below:

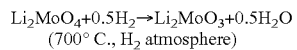

$$Li_2MoO_4 + 0.5H_2 \rightarrow Li_2MoO_3 + 0.5H_2O$$
(700° C., $H_2$ atmosphere)    Reaction Scheme 1

Comparative Example 1

The cathode active material $Li_2MoO_3$ prepared in Preparation Example 1 and $LiCoO_2$ (available from Umicore) were mixed in a ratio of 76.8:19.2 by weight to form an active material powder. Then, the active material powder and carbon black were uniformly mixed in a ratio of 96(76.8:19.2):2 by weight. Then, a polyvinylidene fluoride (PVDF) binder solution was added to prepare a slurry with a ratio of active material ($LiCoO_2$):active material ($Li_2MoO_3$):carbon black: binder=76.8:19.2:2:2 by weight. In order to prepare a lithium battery, a half cell (2032 size) using $SiO_X$ as an anode was assembled with a cathode prepared by coating an Al foil having a thickness of 15 μm with the active material slurry, drying the resultant to form a cathode plate, and then performing vacuum drying on the cathode plate. Then, the lithium battery was charged and discharged at a temperature of 60° C. and a constant current of 1 C in a voltage range of about 2.5 to about 4.35 V, as will be described below.

Comparative Example 2

A half cell (2032 size) using lithium as a counter electrode was assembled with a cathode prepared by coating an Al foil with a slurry containing an active material ($LiNi_{0.5}Mn_{1.5}O_4$ (Nikki)), a conducting agent (ketjen black)(EC-600JD), and a binder (PVdF) in a ratio of 96:1.5:2.5 by weight, to prepare a lithium battery. Then, the lithium battery was electrochemically evaluated while being charged and discharged in a voltage range of about 3.5 to about 4.9 V, as will be described below.

Example 1

0.1 g of poly(ethyleneglycol) methylether methacrylate (Aldrich) and 20 ml of acetone were mixed for two hours to form a mixture solution. Then, 5 g of the active material $Li_2MoO_3$ prepared in Preparation Example 1 was added to the mixture solution; and solvent was evaporated from the mixture solution while the mixture solution was stirred. Then, the resultant was dried in an oven for 12 hours at 100° C. A cathode was prepared using the resultant as a cathode active material and evaluated using the same manner as in Comparative Example 1.

Example 2

0.1 g of poly(ethyleneglycol) methylether methacrylate (Aldrich), 0.15 g of di(ethyleneglycol) methylether methacrylate (Aldrich) and 20 ml of acetone were mixed for two hours to form a mixture solution. Then, 5 g of the active material $Li_2MoO_3$ prepared in Preparation Example 1 was added to the mixture solution; and solvent was evaporated from the mixture solution while the mixture solution was stirred. Then, the resultant was dried in an oven for 12 hours at 100° C. A cathode was prepared using the resultant as a cathode active material and evaluated using the same manner as in Comparative Example 1.

Example 3

0.1 g of poly(ethyleneglycol) methylether methacrylate (Aldrich) and 20 ml of acetone were mixed for two hours to form a mixture solution. Then, 5 g of the active material $LiNi_{0.5}Mn_{1.5}O_4$ (Nikki) was added to the mixture solution; and solvent was evaporated from the mixture solution while the mixture solution was stirred. Then, the resultant was dried in an oven for 12 hours at 100° C. A cathode was prepared using the resultant as a cathode active material and evaluated using the same manner as in Comparative Example 2.

Example 4

0.1 g of poly(ethyleneglycol)diacrylate (Aldrich) and 20 ml of acetone were mixed for two hours to form a mixture solution. Then, 5 g of the active material $LiNi_{0.5}Mn_{1.5}O_4$ (Nikki) was added to the mixture solution; and solvent was evaporated from the mixture solution while the mixture solution was stirred. Then, the resultant was dried in an oven for 12 hours at 100° C. A cathode was prepared using the resultant as a cathode active material and evaluated using the same manner as in Comparative Example 2.

Example 5

0.1 g of poly(ethyleneglycol)dimethacrylate (Aldrich) and 20 ml of acetone were mixed for two hours to form a mixture solution. Then, 5 g of the active material $LiNi_{0.5}Mn_{1.5}O_4$ (Nikki) was added to the mixture solution; and solvent was evaporated from the mixture solution while the mixture solution was stirred. Then, the resultant was dried in an oven for 12 hours at 100° C. A cathode was prepared using the resultant as a cathode active material and evaluated using the same manner as in Comparative Example 2.

Example 6

0.1 g of poly(ethyleneglycol) ethylether methacrylate (Aldrich) and 20 ml of acetone were mixed for two hours to form a mixture solution. Then, 5 g of the active material $LiNi_{0.5}Mn_{1.5}O_4$ (Nikki) was added to the mixture solution; and solvent was evaporated from the mixture solution while the mixture solution was stirred. Then, the resultant was dried in an oven for 12 hours at 100° C. A cathode was prepared using the resultant as a cathode active material and evaluated using the same manner as in Comparative Example 2.

Example 7

0.1 g of di(ethyleneglycol) methylether methacrylate (Aldrich) and 20 ml of acetone were mixed for two hours to form a mixture solution. Then, 5 g of the active material $LiNi_{0.5}Mn_{1.5}O_4$ (Nikki) was added to the mixture solution; and solvent was evaporated from the mixture solution while the mixture solution was stirred. Then, the resultant was dried in an oven for 12 hours at 100° C. A cathode was prepared using the resultant as a cathode active material and evaluated using the same manner as in Comparative Example 2.

EVALUATION

Charging and discharging experiments were performed on the lithium batteries prepared in Comparative Example 1, and Examples 1 and 2 at a high temperature of 60° C.

Prior to the charging and discharging experiments at the high temperature, the lithium batteries were charged at room temperature and a constant current of 0.2 C until the voltage of each lithium battery reached 4.35 V. Then, a constant voltage of 4.35 V was maintained while the current voltage of 4.35 V was being applied until the current of each lithium battery reached 0.1 C. The lithium batteries were discharged at a constant current of 0.2 C until the voltage of each lithium battery reached 2.5 V. The above-described charging and discharging were repeated five times for a formation process; and then the charging and discharging experiments were performed at the high temperature (60° C.). The charging and discharging experiments were performed at the high temperature by charging the lithium batteries at a constant current 1 C until the voltage of each lithium battery reached 4.35 V and then maintaining a constant voltage of 4.35 V while the current voltage of 4.35 V was applied until the current of each lithium batteries reached 0.1 C. The lithium batteries were discharged at a constant current of 1 C until the voltage of each lithium battery reached 2.5 V. The above-described charging and discharging were repeated 50 times. In Table 1, a capacity retention rate is defined by Equation 1 below.

Charging and discharging experiments were performed on the lithium batteries prepared in Comparative Example 2, and Examples 3 through 7 at a high temperature of 45° C.

Prior to the charging and discharging experiments at the high temperature, the lithium batteries were charged at room temperature and a constant current of 0.5 C until the voltage of each lithium battery reaches 4.9 V. Then, a constant voltage of 4.9 V was maintained while the current voltage of 4.9 V was being applied until the current of each lithium battery reached 0.1 C. The lithium batteries were discharged at a constant current of 0.2 C until the voltage of each lithium battery reached 3.5 V. The above-described charging and discharging were repeated five times for a formation process; and then the charging and discharging experiments were performed at the high temperature (45° C.). The charging and discharging experiments were performed at the high temperature by charging the lithium batteries at a constant current 1 C until the voltage of each lithium battery reached 4.9 V and then maintaining a constant voltage of 4.9 V while the current voltage of 4.9 V was applied until the current of each lithium battery reached 0.1 C. Then, the lithium batteries were discharged at a constant 1 C until the voltage of each lithium battery reached 3.5 V. The above-described charging and discharging were repeated 50 times. In Table 1, a capacity retention rate is defined by Equation 1 below:

Capacity retention rate[%]=[Discharge capacity at $50^{th}$ cycle(high temperature)/Discharge capacity at $1^{st}$ cycle(high temperature)]×100    Equation 1

TABLE 1

| | Capacity retention rate [%] |
|---|---|
| Comparative Example 1 | 42.33 |
| Example 1 | 62.56 |
| Example 2 | 71.70 |
| Comparative Example 2 | 11.02 |
| Example 3 | 69.27 |
| Example 4 | 81.47 |
| Example 5 | 81.82 |
| Example 6 | 80.24 |
| Example 7 | 89.91 |

As shown in Table 1 and FIGS. 1 and 2, the lithium battery including the cathode active material according to the embodiments (Examples 1 and 2) exhibited an excellent capacity retention rate compared to the lithium battery prepared in Comparative Example 1. In addition, the lithium battery including the cathode active material according to the embodiments (Examples 3-7) exhibited an excellent capacity retention rate compared to the lithium battery prepared in Comparative Example 2.

By way of review, when layered $Li_2MoO_3$ or $LiM_xMn_{2-x}O_4$ (0<x<2, and M is Ni, etc.) having a spinel structure is used as a cathode active material, if a lithium battery is charged and discharged at a high voltage (4.9 V) and a high temperature, a lithium salt or an organic solvent of an electrolyte solution may be decomposed and manganese (Mn) or molybdenum (Mo) may be eluted due to hydrofluoric acid (HF) generated by the reaction of the lithium salt and moisture. Therefore, charge/discharge efficiencies of lithium batteries at high temperature may deteriorate.

When a lithium battery includes the cathode active material according to an embodiment, reaction with an electrolyte solution may be prevented in the lithium battery and charging/discharging efficiencies and cycle characteristics of the lithium battery at high temperatures may be improved.

The embodiments provide a cathode active material, whereby elution of transition metal and decomposition of electrolyte solution are prevented during charging and discharging at high temperature.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A cathode active material, comprising:
a lithium-containing metal oxide; and
an acrylate or methacrylate organic material including an alkyleneglycol unit;
wherein:
the acrylate or methacrylate organic material including the alkyleneglycol unit is represented by Formula 1 below:

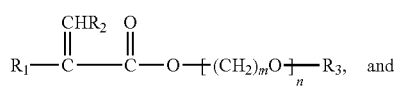

(1)

in Formula 1:
$R_1$ is a hydrogen atom or a methyl group,
$R_2$ is a hydrogen atom, a $C_1$-$C_{20}$ alkyl group, or a $C_6$-$C_{30}$ aryl group,
$R_3$ is a hydrogen atom, a $C_1$-$C_{20}$ alkyl group, a $C_6$-$C_{30}$ aryl group, a methacrylate group, or an acrylate group,
m is an integer of 1 to about 30, and
n is an integer of 1 to about 100,000,
the acrylate or methacrylate organic material including the alkyleneglycol unit includes poly(ethyleneglycol) methyl ether methacrylate; and
the acrylate or methacrylate organic material including the alkyleneglycol unit is mixed with and coated directly on the entire surface of the lithium-containing metal oxide.

2. The cathode active material as claimed in claim 1, wherein the acrylate or methacrylate organic material including the alkyleneglycol unit further includes at least one selected from the group of poly(ethyleneglycol)diacrylate, poly(ethyleneglycol)dimethacrylate, poly(ethyleneglycol) ethyl ether methacrylate, di(ethyleneglycol) di(meth)acrylate, tri(ethyleneglycol) di(meth)acrylate, di(ethyleneglycol) (2-ethylhexyl)ether acrylate, di(ethyleneglycol) ethyl ether acrylate, tetra(ethyleneglycol)diacrylate, and di(ethyleneglycol) methyl ether methacrylate.

3. The cathode active material as claimed in claim 1, wherein the acrylate or methacrylate organic material including the alkyleneglycol unit is included in an amount of about 0.01 to about 20 parts by weight, based on 100 parts by weight of the lithium-containing metal oxide.

4. The cathode active material as claimed in claim 1, wherein:
the lithium-containing metal oxide includes at least one selected from the group of $LiCo_{1-x}M_xO_{2-y}L_y$ (0≤x≤0.9, 0≤y≤0.3), $Li_xM_yMo_zO_{3-z}L_a$ (0.5≤x≤2.3, 0≤y≤0.3, 0.7≤z≤1.1, 0≤a≤1.5), $LiMn_{x-y}M_yO_{2x-z}L_z$ (x=1 or 2, 0≤y≤0.5, 0≤z≤1.5), $LiNi_{1-x}Mn_{x-y}M_yO_{2x-z}L_z$ (0<x<1, 0≤y≤0.3, 0≤z≤2), $Li_{1-x-y}Co_xMn_yM_zO_{2-a}L_a$ (0≤x≤0.5, 0≤y≤0.5, 0≤z≤0.5, 0≤a≤1), $LiMn_{1-x}M_xPO_4$ (0≤x≤0.99), and $LiFe_{1-x}M_xPO_4$ (0≤x≤0.99),
M includes at least one selected from the group of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), scandium (Sc), and yttrium (Y); and
L includes sulfur (S) or fluorine (F).

5. A cathode comprising the cathode active material as claimed in claim 1.

6. The cathode as claimed in claim 5, wherein the acrylate or methacrylate organic material including the alkyleneglycol unit further includes at least one selected from the group of poly(ethyleneglycol)diacrylate, poly(ethyleneglycol) dimethacrylate, poly(ethyleneglycol) ethyl ether methacrylate, di(ethyleneglycol) di(meth)acrylate, tri(ethyleneglycol) di(meth)acrylate, di(ethyleneglycol) (2-ethylhexyl)ether acrylate, di(ethyleneglycol) ethyl ether acrylate, tetra(ethyleneglycol)diacrylate, and di(ethyleneglycol) methyl ether methacrylate.

7. The cathode as claimed in claim 5, wherein the acrylate or methacrylate organic material including the alkyleneglycol unit is included in an amount of about 0.01 to about 20 parts by weight, based on 100 parts by weight of the lithium-containing metal oxide.

8. The cathode as claimed in claim 5, wherein:
the lithium-containing metal oxide includes at least one selected from the group of $LiCo_{1-x}M_xO_{2-y}L_y$ (0≤x≤0.9, $0 \le y \le 0.3$), $Li_xM_yMo_zO_{3-z}L_a$ ($0.5 \le x \le 2.3$, $0 \le y \le 0.3$, $0.7 \le z \le 1.1$, $0 \le a \le 1.5$), $LiMn_{x-y}M_yO_{2x-z}L_z$ (x=1 or 2, $0 \le y \le 0.5$, $0 \le z \le 1.5$), $LiNi_{1-x}Mn_{x-y}M_yO_{2x-z}L_z$ ($0<x<1$, $0 \le y \le 0.3$, $0 \le z \le 2$), $Li_{1-x-y}Co_xMn_yM_zO_{2-a}L_a$ ($0 \le x \le 0.5$, $0 \le y \le 0.5$, $0 \le z \le 0.5$, $0 \le a \le 1$), $LiMn_{1-x}M_xPO_4$ ($0 \le x \le 0.99$), and $LiFe_{1-x}M_xPO_4$ ($0 \le x \le 0.99$), M includes at least one selected from the group of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), scandium (Sc), and yttrium (Y); and L includes sulfur (S) or fluorine (F).

9. A lithium battery comprising the cathode as claimed in claim 5.

10. The cathode as claimed in claim 5, wherein the cathode active material is mixed with a binder, and the binder includes one selected from the group of a vinylidene fluoride/hexafluoropropylene copolymer, polyvinylidene fluoride, polyacrylonitrile, polymethylmethacrylate, polytetrafluoroethylene, and a styrene butadiene rubber polymer.

11. The cathode active material as claimed in claim 1, wherein the lithium-containing metal oxide is a lithium-containing metal oxide powder, and the acrylate or methacrylate organic material including the alkyleneglycol unit is mixed with and coated directly on the entire surface of the lithium-containing metal oxide powder.

12. A method of preparing of a cathode active material, the method comprising:

mixing an entirely uncoated lithium-containing metal oxide, an acrylate or methacrylate organic material including an alkyleneglycol unit, and a solvent to obtain a mixture; and drying the mixture, such that the acrylate or methacrylate organic material including the alkyleneglycol unit is coated directly on the entire surface of the lithium-containing metal oxide;

wherein:

the acrylate or methacrylate organic material including the alkyleneglycol unit is represented by Formula 1 below:

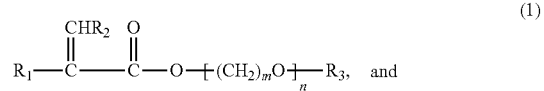

(1)

in Formula 1:

$R_1$ is a hydrogen atom or a methyl group, $R_2$ is a hydrogen atom, a $C_1$-$C_{20}$ alkyl group, or a $C_6$-$C_{30}$ aryl group, $R_3$ is a hydrogen atom, a $C_1$-$C_{20}$ alkyl group, a $C_6$-$C_{30}$ aryl group, a methacrylate group, or an acrylate group, m is an integer of 1 to about 30, n is an integer of 1 to about 100,000, and the acrylate or methacrylate organic material including the alkyleneglycol unit includes poly(ethyleneglycol) methyl ether methacrylate.

13. The method as claimed in claim 12, wherein the drying is performed for about 0.1 to about 20 hours at a temperature equal to or lower than about 100° C.

14. The method as claimed in claim 12, wherein the uncoated lithium-containing metal oxide is an uncoated lithium-containing metal oxide powder, and the method includes mixing the entirely uncoated lithium-containing metal oxide powder, the acrylate or methacrylate organic material including the alkyleneglycol unit, and a solvent to obtain a mixture; and drying the mixture, such that the acrylate or methacrylate organic material including the alkyleneglycol unit is coated directly on the entire surface of the lithium-containing metal oxide powder.

* * * * *